(12) United States Patent
Bolis

(10) Patent No.: US 8,422,142 B2
(45) Date of Patent: Apr. 16, 2013

(54) MEMBRANE DEVICE THE MEMBRANE OF WHICH CAN BE DEFORMED BY ACTUATION WITH A FAST RESPONSE TIME

(75) Inventor: Sébastien Bolis, Crolles (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 31 days.

(21) Appl. No.: 13/235,428

(22) Filed: Sep. 18, 2011

(65) Prior Publication Data

US 2012/0069450 A1 Mar. 22, 2012

(30) Foreign Application Priority Data

Sep. 21, 2010 (FR) ...................................... 10 57552

(51) Int. Cl.
G02B 1/06 (2006.01)
(52) U.S. Cl.
USPC .......................................................... 359/665
(58) Field of Classification Search .................. 359/665, 359/666
See application file for complete search history.

(56) References Cited

U.S. PATENT DOCUMENTS

| 6,188,526 | B1 | 2/2001 | Sasaya et al. |
| 6,344,930 | B1 | 2/2002 | Kaneko et al. |
| 2008/0112059 | A1 | 5/2008 | Choi et al. |
| 2010/0118413 | A1 | 5/2010 | Kim et al. |
| 2010/0118414 | A1 | 5/2010 | Bolis |
| 2010/0182703 | A1 | 7/2010 | Bolis |
| 2010/0195213 | A1 | 8/2010 | Bolis |
| 2010/0202054 | A1 | 8/2010 | Niederer |
| 2011/0032624 | A1 | 2/2011 | Bolis et al. |

FOREIGN PATENT DOCUMENTS

| EP | 1 921 471 A1 | 5/2008 |
| EP | 2 034 338 A1 | 3/2009 |
| FR | 2 919 073 A1 | 1/2009 |
| FR | 2 919 074 A1 | 1/2009 |
| FR | 2 930 352 A1 | 10/2009 |
| FR | 2 938 349 A1 | 5/2010 |

OTHER PUBLICATIONS

Search Report issued Feb. 3, 2011, in French Patent Application No. FR 1057552 (with English Translation of Category of Cited Documents).
U.S. Appl. No. 13/395,169, filed Mar. 9, 2012, Bolis, et al.

Primary Examiner — Jack Dinh
(74) Attorney, Agent, or Firm — Oblon, Spivak, McClelland, Maier & Neustadt, L.L.P.

(57) ABSTRACT

Device including a membrane and a support defining a cavity containing a fluid, where the membrane includes an anchoring area to the support, a central area able to be deformed following a displacement of fluid and an actuation area between the anchoring and central areas, and means of actuation to apply stress to the membrane in the actuation area and cause a displacement of the fluid to the central area following an actuation. The cavity includes a main chamber in the central area and a peripheral chamber in the actuation area communicating with the main chamber. The peripheral chamber includes at least one forced flow structure favoring the flow of at least a part of the fluid from the peripheral chamber to the main chamber or vice versa following the actuation. A given forced flow structure has no attachment both to the support and to the membrane.

18 Claims, 12 Drawing Sheets

MEMBRANE DEVICE THE MEMBRANE OF WHICH CAN BE DEFORMED BY ACTUATION WITH A FAST RESPONSE TIME

TECHNICAL FIELD

The present invention concerns a device with a deformable membrane trapping fluid and having means of actuating the membrane to adjust its radius of curvature. These devices can be used as variable focal length liquid lenses, liquid lenses for corrections of optical aberrations for active optics, image-stabilisation devices, or variable focal length mirrors. Liquid lenses can be used, for example, in mobile telephones with a photographic device or camera function. Many developments are pending, notably an autofocus function and a zoom function. Another application concerns cameras operating in the infrared spectrum (IR). Progress is slower with integration: in most cases the optics are dissociated from the cameras. Several developments are pending, notably integration of optics (creation of a camera module), integration of the autofocus function, etc. As things stand, the associated technical solutions are not known and have yet to be defined.

In a deformable membrane mirror application the membrane is reflective. It may also be desired to adjust the focal length of the mirror, and therefore its radius of curvature. Such a mirror may be used in ophthalmology or active optics. Finally, these optical devices, whether of the lens or mirror type, can be used to stabilise images.

STATE OF THE PRIOR ART

Applications FR 2 919 073, FR 2 919 074, FR 2 930 352 and FR 2 938 349, which show such devices with deformable membranes, are known. Reference should be made FIG. 1, which shows schematically as a cross-section a known optical membrane device. In this device, for a given temperature range and a given ambient pressure range, the membrane 1 attached to a support 2 in an anchoring area 1.1 helps to trap a substantially constant volume of fluid 4. The fluid 4 is trapped by membrane 1 anchored to support 2. Support 2 and the membrane then form a cavity 5 with a bottom 6 which is on the support 2 and possibly sides 7 if support 2 is dished. Membrane 1 therefore has, starting from support 2: anchoring area 1.1 at its periphery, followed by an actuation area 1.2 on which means of actuation 8 operate; it is surrounded by anchoring area 1.1. After this is a central area 1.3, which is surrounded by actuation area 1.2, the curvature of which it is desired to adjust. Central area 1.3 equates to the optical field of the obtained optical device.

When they are actuated from a rest position to an operating position, the means of actuation 8 seek to reduce the thickness of the fluid 4 trapped by membrane 1 to their level, and generate a displacement of the fluid 4 to central area 1.3, thus deforming membrane 1, giving it a convex shape. Membrane 1 is represented with dotted lines at rest and with solid lines in an operating position in many of the section figures. The arrows indicate the movement of the fluid 4. The displacement of the fluid 4 to anchoring area 1.1 is not significant due to the proximity of the sides 7 and the anchoring.

Membrane 1 is sufficiently flexible for the deformation of its central area 1.3 to be reversible, when the actuation has ceased and the means of actuation 8 have returned to their rest position. It forms a barrier to the fluid 4, which is trapped such that it does not escape. One of the main faces of membrane 1 is in contact with the fluid 4 trapped in cavity 5.

The means of actuation 8 can be electrostatic, as illustrated in FIG. 1, and be distributed both on membrane 1 and on the bottom 6 of cavity 5. As a variant, they can be piezoelectric, thermal bimorphs, or magnetic. In all configurations they act on actuation area 1.2 of membrane 1, and may or may not be connected to it at rest. During actuation the means of actuation 8 come into contact with the whole of actuation area 1.2 of membrane 1, or only with parts of it.

If the membrane device is a lens, the membrane, at least in its central part, and the support facing the central area, are transparent to an optical beam intended to propagate through the lens.

If the membrane device is a mirror, the membrane, at least in its central area, is reflective to an incident optical beam.

In configurations in which the area which causes the displacement of the fluid, substantially equating to actuation area 1.2, is of large dimensions compared to the thickness of fluid 4 which is trapped by membrane 1 in actuation area 1.2, it is difficult for the fluid 4 to flow to central area 1.3.

The fluid 4 is trapped between the part of the means of actuation 8 cooperating with membrane 1 which is actuated, and the bottom 6 of cavity 5, and thus the fluid 4 flows slowly to central area 1.3. This difficulty has a direct impact on the membrane device's response time.

In addition, in this type of membrane device, it is very advantageous to using a large area of contact between the means of actuation 8 and the membrane, in order to displace a large quantity of fluid 4 and therefore obtain a substantial deformation of membrane 1. A large variation of focal distance may thus be obtained. Conversely, it is equally advantageous to reduce the quantity of fluid 4 perpendicular to the means of actuation 8. In the case of electrostatic means of actuation 8, there is at least one pair of facing electrodes, one of which is mobile, referenced 8.1 on the side of membrane 1, and the other of which is fixed, referenced 8.2 on the side of the bottom 6 of cavity 5. For a given control voltage and a given energy consumption level, the smaller the distance between the electrodes 8.1, 8.2 of the pair, the greater the electrostatic force generated, and the greater the amplitude of the deformation. It is therefore advantageous to minimise the spacing between the two electrodes 8.1, 8.2 of the pair, and therefore the thickness of fluid 4 occupying the space between these two electrodes 8.1, 8.2. The foregoing assertion is true, of course, provided there is between the two electrodes 8.1, 8.2 of the pair sufficient fluid 4 to cause the sought displacement of fluid 4.

Whatever the type of the means of actuation 8, it may be advantageous to minimise the quantity of fluid 4 trapped by membrane 1 in order to restrict the pressure exerted by the latter if, due to the orientation of the membrane device, the fluid 4 exerts a pressure due to the gravity on membrane 1. It is also advantageous to restrict the quantity of fluid 4 trapped in order to improve, for a given membrane 1 rigidity, the impact-resistance of the membrane device.

It may also be advantageous, in order to restrict variations of focal distance caused involuntarily, whatever the type of means of actuation 8, to minimise the quantity of fluid 4 in order to restrict variations of volume of fluid 4 caused by substantial temperature and/or pressure variations.

ACCOUNT OF THE INVENTION

The aim of the present invention is, indeed, to offer a membrane device which does not have the disadvantages mentioned above.

One aim is, in particular, to offer a membrane device having an increased response time, whilst retaining a great amplitude of deformation of the membrane when an actuation occurs.

Another aim of the invention is to offer a membrane device which, when it has electrostatic means of actuation, enables this great deformation amplitude to be obtained with small energy consumption.

Yet another aim of the invention is to offer a membrane device which is resistant to impacts, and the effect of the gravity on the fluid does not risk damaging the membrane.

To attain these aims the invention proposes to force the flow from a part of the fluid to the central area of the membrane when an actuation occurs, acting on the area of actuation of the membrane to facilitate and accelerate this flow.

More specifically, the present invention offers a device including a membrane and a support, defining a cavity, containing a substantially constant quantity of a fluid, where the membrane has an anchoring area peripheral to the support, a central area which is able to be deformed reversibly when a displacement of the fluid occurs, and an actuation area between the anchoring area and the central area, together with means of actuation intended to apply stress to the membrane in the actuation area, and to cause a displacement of the fluid to the central area when an actuation occurs. According to the invention, the cavity has a main chamber at the level of the central area and a peripheral chamber at the level of the actuation area communicating with the main chamber, and in addition the peripheral chamber includes at least one forced flow structure communicating with the main chamber to favour the flow of at least a part of the fluid from the peripheral chamber to the main chamber, or vice versa, wherein an actuation occurs, where the remainder of the fluid is displaced from the peripheral chamber to the main chamber, or vice versa, without passing through the forced flow structure, and wherein a given forced flow structure has no fastenings both to the support and to the membrane.

The means of actuation are designed to allow symmetrical deformation of the membrane, for example to provide a variable focus function, or an asymmetrical deformation, for example to provide an image-stabilisation function.

When the cavity is defined in the support by sides and a bottom, the forced flow structure may include a perforated wall which is protruding from the sides into the peripheral chamber in the direction of the main chamber.

When the means of actuation include multiple actuators coming into contact with the membrane in the actuation area in a contact area, the perforated wall may include at least one orifice facing a contact area. The efficiency of the forced flow structure is increased by this means.

As a variant, the perforated wall may include several areas with many orifices, and at least one area with no orifices, where the means of actuation are able to act on the membrane in the actuation area opposite one or more areas with many orifices, and not in the area with no orifices.

By fitting to the perforated wall at least one electrode of the means of actuation of the electrostatic type, where this electrode is opposite another electrode supported by the membrane, it is thus possible to reduce the thickness of fluid between the two electrodes, and to make the means of actuation more efficient for the same energy consumption.

With the same aim, it is preferable that the perforated wall should be closer to the actuation area than to the bottom of the cavity.

As a variant, or in combination, while the support forms a bottom to the cavity, the forced flow structure may include multiple channels incorporated in the membrane in the actuation area and/or incorporated in the bottom facing the actuation area and/or incorporated in the means of actuation, if they are in contact with the fluid, where these channels are directed from the peripheral chamber to the main chamber. To improve the efficiency of the forced flow structure, the channels are preferably directed radially relative to the centre of the main chamber.

Moreover, it is possible that the forced flow structure may contain at least one orthoradial channel, in order that, when an actuation occurs which is dedicated to a part of the actuation area, the fluid can be evacuated as rapidly as possible from a part of the peripheral chamber concerned by the part of the actuation area subject to actuation to the remainder of the peripheral chamber and the main chamber.

The channels can be formed in the bottom of the support, and when the bottom of the support is multi-layered the channels can be totally or partially formed in a surface layer of the bottom.

The channels can be formed in the actuation area of the membrane, and the actuation area is advantageously thickened relative to the central area.

The membrane may include a stack of layers in the actuation area, in which the channels are formed, and this stack can extend at least partly in the anchoring area.

When the forced flow structure is incorporated in the means of actuation, the channels can be defined by the means of actuation connected to the bottom and/or by the means of actuation connected to the membrane in contact with the fluid, and the channels can bite into or expose the bottom or the membrane, respectively.

The channels located in the bottom can be made to penetrate the main chamber, again with the aim of reducing the device's response time.

The channels can open out into a dish supported by the bottom located in the main chamber; this facilitates flow to the centre of the device.

The bottom may include a peripheral pit in the peripheral chamber opposite the main chamber, where the channels open out into the pit when they are formed in the bottom. Technological integration and manufacture of such devices are facilitated thereby.

The membrane device forming the subject of the invention may be a mirror or a lens.

The present invention also concerns an image-taking device including a membrane device thus characterised.

BRIEF DESCRIPTION OF THE ILLUSTRATIONS

The present invention will be better understood on reading the description of examples of embodiment given, purely as an indication and in no way limiting, making reference to the annexed illustrations in which:

FIG. 1, previously described, shows in section a membrane device of the prior art;

Well-known structures are not represented in detail, in order not to overburden the present invention unnecessarily.

Identical, similar or equivalent parts of the different figures described below bear the same numerical references, to facilitate moving from one figure to another.

The various parts represented in the figures are not necessarily represented with a uniform scale, in order to make the figures more readable.

DETAILED ACCOUNT OF PARTICULAR EMBODIMENTS

Figure 2A:
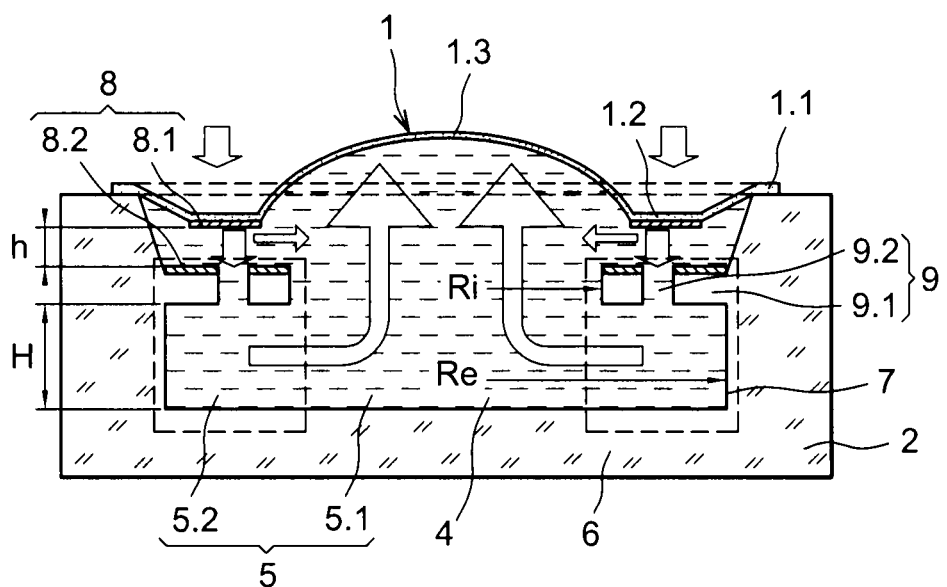
FIG. 2A shows a membrane device forming the subject of the invention with a forced flow structure with a perforated wall.
Figure 2B:
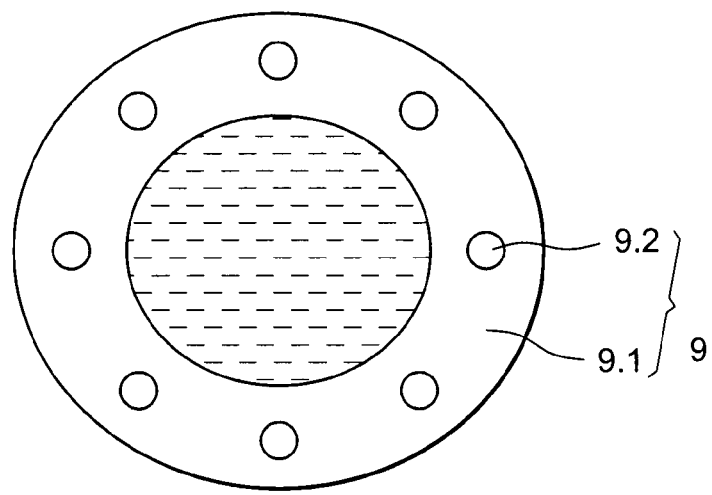
FIGS. 2B and 2C show various perforated wall embodiments.
Figure 2C:
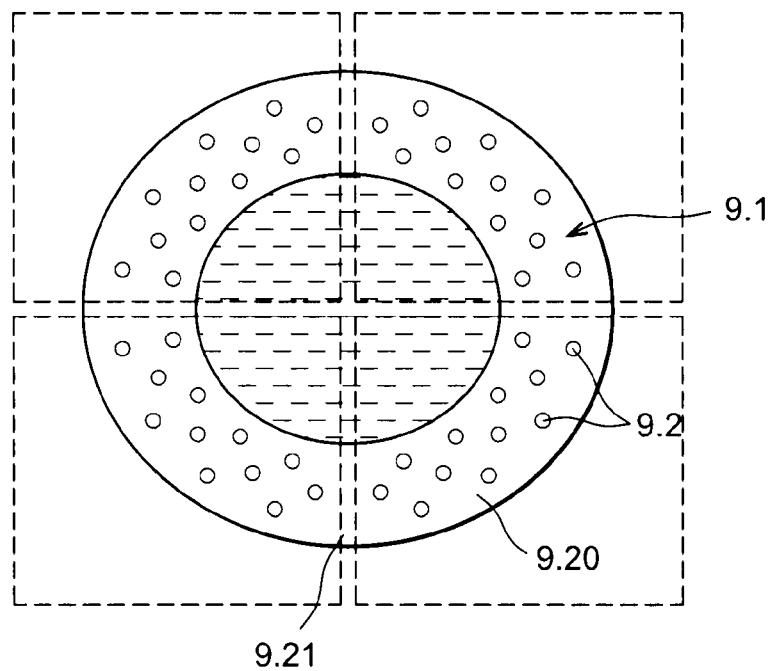

We shall now turn to FIGS. 2A to 2C, which show from various angles a first embodiment of a membrane device forming the subject of the invention. In this first embodiment, support 2 includes a dish. This membrane device may be an optical device of a lens or mirror type.

Figure 1:
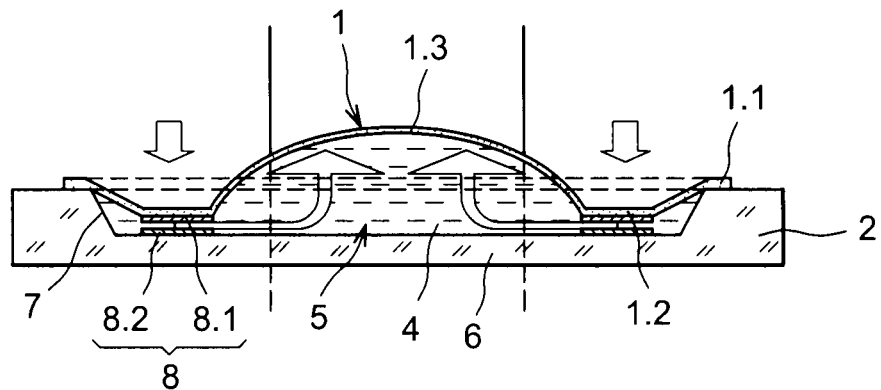

This membrane device, seen in section in FIG. 2A, includes, like the one represented in FIG. 1, membrane 1 with its anchoring area 1.1, its actuation area 1.2 surrounded by anchoring area 1.1 and its central area 1.3 surrounded by actuation area 1.2. Membrane 1 includes at least one continuous layer which extends across the entire surface from the anchoring area to the central area. It may be multi-layered, at least locally.

In this first example, support 2 includes a bottom 6 and sides 7 helping to define cavity 5, in which the fluid 4 is located. Membrane 1, which is anchored to support 2 in its anchoring area 1.1, traps the fluid 4. Thus, membrane 1 may be substantially flat, for example, at rest. As a variant illustrated in FIG. 6C, support 2 may be substantially flat without a dish, and membrane 1 then has a convex shape at rest.

The means of actuation 8 are represented as being of the electrostatic type, with one or more pairs of facing electrodes including, for each pair, a mobile electrode 8.1 and a fixed electrode 8.2. The location of the fixed electrode will be described below. In cavity 5 a central main chamber 5.1 may be distinguished at the level of the central area, and a peripheral chamber 5.2 at the level of the actuation area 1.2; it surrounds main chamber 5.1. This means that main chamber 5.1 extends to the location where central area 1.3 of the membrane is located, opposite central area 1.3. Similarly, the peripheral chamber 5.2 extends to the location where actuation area 1.2 is located, opposite actuation area 1.2. Naturally, the central area and the actuation area do not necessarily define the main chamber and the peripheral chamber. The latter may be smaller than the corresponding areas. Peripheral chamber 5.2 is equipped with at least one forced flow structure 9 which channels a part of the fluid 4 located in peripheral chamber 5.2 to main chamber 5.1 when the means of actuation 8 are actuated from a rest position of membrane 1 to an operating position of membrane 1. Membrane 1 has no contact with the support outside anchoring area 1.1 in the rest position. Its sole anchoring to support 2 is accomplished in anchoring area 1.1. A given forced flow structure 9 has no fastenings attaching it both to support 2 and to membrane 1. This means that the forced flow structure 9 is never attached to support 2 and also to membrane 1. It may either be attached to support 2, or be attached to membrane 1. As a variant, it could be resting on support 2, without being attached to it, and it could be held in place by a support of the membrane or under the action of gravity. Displacement of the fluid 4 occurs in the reverse direction when the means of actuation 8 are actuated from the operating position to the rest position.

In this example, only a part of the fluid 4 located in peripheral chamber 5.2 is channelled in forced flow structure 9, and another part, i.e. the remainder of the fluid, passes directly into main chamber 5.1 without passing into forced flow structure 9, since peripheral chamber 5.2 communicates directly with main chamber 5.1 outside forced flow structure 9. In all the section figures the arrows illustrate the movement of the fluid 4 when the means of actuation 8 are actuated from a rest position to an operating position.

In this example illustrated in FIG. 2, forced flow structure 9 is defined by the bottom 6 of the cavity, by the sides 7 and by a perforated wall 9.1 which protrudes from the sides 7 in peripheral chamber 5.2 towards main chamber 5.1. This wall 9.1 is fitted with at least one through orifice 9.2 to channel the fluid 4 from peripheral chamber 5.2 and orient it towards main chamber 5.1. Perforated wall 9.1 is ring-shaped in the example described, which assumes that the sides 7 of the cavity follow a circle.

FIGS. 2B and 2C show examples of the perforated wall 9.1 which helps define forced flow structure 9 with its through orifices 9.2. Each of them can be positioned opposite a contact area between the means of actuation 8 and membrane 1 at actuation from a rest position to an operating position. This is what is illustrated in FIG. 2B.

In FIG. 2C four separate areas 9.20 have been illustrated in perforated wall 9.2, each having multiple orifices 9.2, and each substantially extending over one quarter of perforated wall 9.1. These areas 9.20 are said to be orifice-rich. Orifices 9.2 may or may not be distributed in the same manner in each of the four areas 9.20. Each of areas 9.20 may be associated with a particular actuator of the means of actuation 8. These orifice-rich areas 9.20 are separated by orifice-free areas 9.21. It is supposed that in this example there are four diametrically opposed actuators, arranged two-by-two, each of them having a mobile electrode 8.1 connected to membrane 1 in actuation area 1.2, and opposite mobile electrode 8.1 a fixed electrode 8.2 connected to the perforated wall 9.1. There may be fewer orifice-rich areas, and there may be only one orifice-free area.

It may be envisaged that perforated wall 9.1 supports only a single fixed electrode 8.2 while membrane 1 supports several mobile electrodes 8.1 to form several actuators of the means of actuation 8. The reverse is, of course, possible.

It is also possible to have several mobile electrodes 8.1 on membrane 1 and several fixed electrodes 8.2 on perforated wall 9.1. Orifices 9.2 of perforated wall 9.1 reduce the area of fixed electrodes 8.2 compared to what it would be if the wall was not perforated. This parameter will be taken into account in determining the dimensions of the fixed electrodes of the electrostatic actuators. With this aim, it is possible to alter the inner diameter Ri of the ring forming perforated wall 9.1, for example by reducing it, and/or alter the inner diameter Re of cavity 5, for example by increasing it, so as to increase the area of perforated wall 9.1.

Membrane 1 is not anchored on this perforated wall 9.1.

It is possible for the actuators of the means of actuation 8 not to be actuated simultaneously; membrane 1 can then create a non-axisymmetric diopter in the case of an image stabilisation application, for example.

The number of orifices 9.2, their size and their distribution on perforated wall 9.1 are optimised to facilitate the flow of the fluid 4 when the means of actuation 8 are actuated.

Due to forced flow structure 9 placed in peripheral chamber 5.2, the flow of the fluid 4 is facilitated and accelerated at actuation, and the membrane device's response time is optimised.

With such a structure it is possible to increase the volume of the fluid 4 compared to that of the device of the prior art illustrated in FIG. 1, for a given area of membrane 1 and a given electrostatic force provided by the means of actuation.

Indeed, it is possible to increase significantly the thickness of fluid 4 in cavity 5 whilst keeping a distance, at rest, between electrodes 8.1, 8.2 of an actuator which is substantially the same as in the case of the device of FIG. 1. The distance between the two electrodes 8.1, 8.2 at rest is noted h. Perforated wall 9.1 is spaced by a distance H from the bottom 6 of cavity 5 and this distance H may be very much greater than distance h. By this means, the membrane device's response time is increased very significantly compared to that of the prior art illustrated in FIG. 1.

Conversely, such a membrane device does not enable an improved resistance to gravity, i.e. a minimised effect of the weight of fluid 4 on membrane 1, to be obtained, nor improved impact-resistance properties to be obtained, since the quantity of fluid 4 is too great.

Orifices 9.2 in perforated wall 9.1 facilitate the flow of the fluid 4 to main chamber 5.1, while the distance between electrodes 8.1, 8.2 of an actuator may remain small. To improve the gravity-resistance and also the impact-resistance of the membrane device it is possible to use another forced flow structure 9. We refer now to FIGS. 3A to 3I.

Forced flow structure 9 is formed from channels 9.10 extending in peripheral chamber 5.2 and radiating outwards with a sunburst pattern to main chamber 5.1.

Figure 3A:
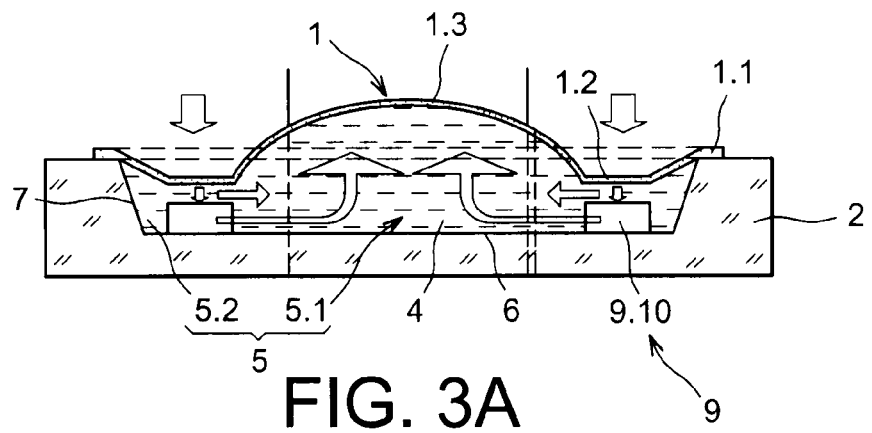
FIGS. 3A to 3I show in section or as a top view different variants of a forced flow structure cooperating with the bottom of the cavity.

In FIG. 3A forced flow structure 9 with channels 9.10 is positioned on the bottom 6 of support 2. It is in relief relative to the bottom 6 of support 2. Channels 9.10 stop before main chamber 5.1 and have no contact with the sides 7. They do not encroach into the optical field in the case of a lens or mirror type device. When the means of actuation 8 are actuated a part of the fluid 4 located in main chamber 5.2 is channelled into these channels 9.10 and is directed to main chamber 5.1. The remainder of the fluid 4 moves directly from peripheral chamber 5.2 to main chamber 5.1 without using channels 9.10.

Figure 3B:
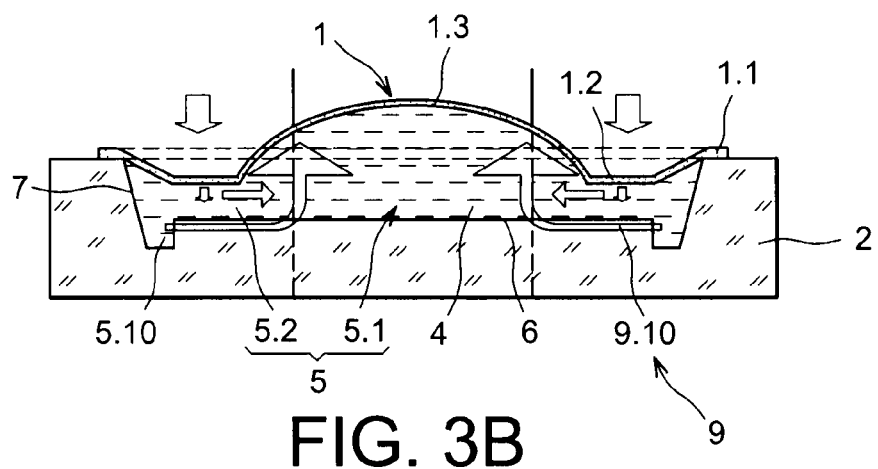

In FIG. 3B the bottom 6 of cavity 5 is hollowed out to define channels 9.10. These channels 9.10 have a substantially constant section in the example described, but this is not an obligation. Concerning sides 7, a peripheral pit 5.10 has been represented, following the sides 7. Channels 9.10 emerge into peripheral pit 5.10, which is deeper than channels 9.10. In the centre, channels 9.10 stop in the optical field which has been represented by vertical dotted lines. In this FIG. 3B the means of actuation have not been represented, for the sake of clarity. However, it will be noted that the thickness of fluid 4 between the top of a channel 9.10 and actuation area 1.2 of membrane 1 is similar to that of the prior art illustrated in FIG. 1. In main chamber 5.1 the bottom 6 is located in the area of the top of channels 9.10 or the bottom 6 between two successive channels 9.10. In this example cavity 5 is circular. It could be envisaged, naturally, for the cavity not to be circular, but parallelepipedic, for example.

Figure 3C:
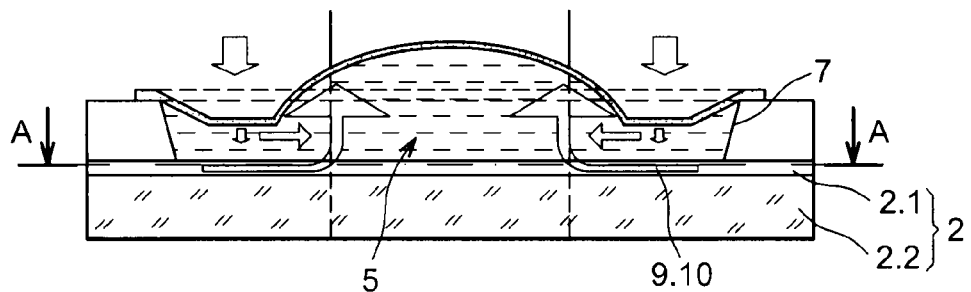

In FIG. 3B the support in the area of the bottom 6 is monolithic. In FIG. 3C it has several layers stacked with a surface layer 2.1 which is resting, in this example, on at least one base layer 2.2. The channels 9.10 are formed in surface layer 2.1. Surface layer 2.1 and the base layer can be made, for example, of silicon oxide or silicon nitride. They are not necessarily made from the same material.

As in FIG. 3B, the channels stop before the sides 7 of cavity 5 and extend as far as the optical field. The peripheral pit is absent. Channels 9.10 could, clearly, extend as far as the sides 7. In FIG. 3C it can be observed that support 2 is made by a substrate forming the multi-layered bottom, and that the sides 7 are made by a bead of glue intended to anchor the membrane to the support, and more specifically to the substrate.

Figure 3D:
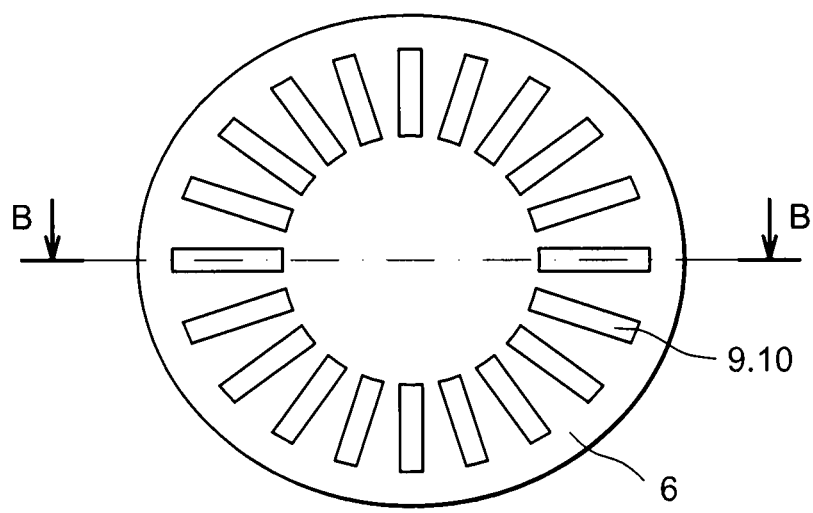
Figure 3E:
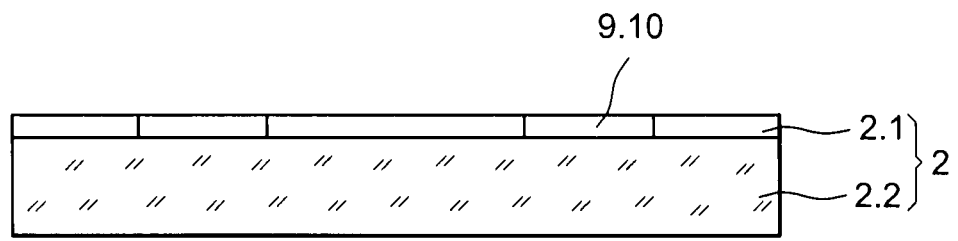
Figure 3F:
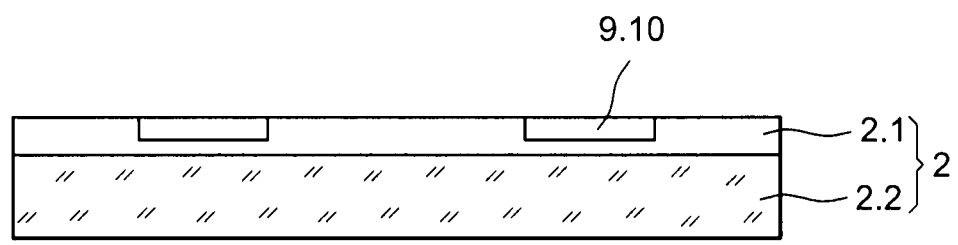

FIG. 3D is a top view of the bottom 6 of the cavity. Radial channels 9.10 are clearly visible. FIG. 3E is a transverse section view along axis BB of support 2 in the area of the bottom 6 of the cavity illustrated in FIG. 3D; the sides 7 are omitted. The channels 9.10 extend through the full thickness of surface layer 2.1; they expose the base layer 2.2. In FIG. 3F, channels 9.10 are less deep; their depth is less than the thickness of surface layer 2.1, and base layer 2.2 is not exposed.

Figure 3G:
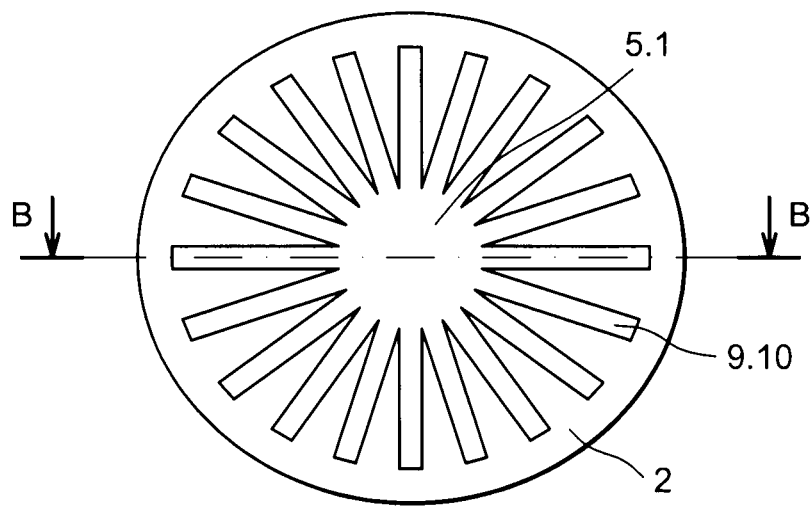

In FIG. 3G channels 9.10 extend into the optical field, i.e. in main chamber 5.1. If the membrane device forming the subject of the invention is an optical device operating in transmission mode, the optical impact of channels 9.10 may be minimised by choosing a fluid 4 and a bottom 6 for support 2 which will have optical indices which are substantially equal or close to one another.

Figure 3H:
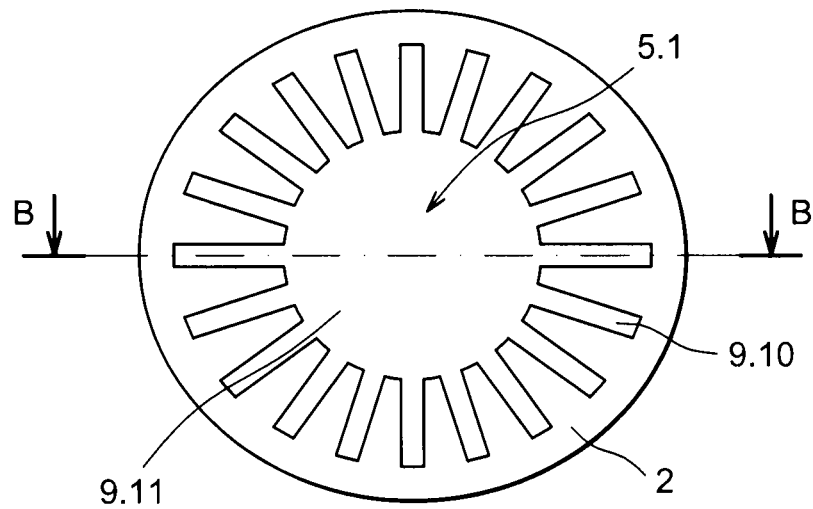

In FIG. 3H channels 9.10 do not extend into the optical field, but emerge in a dish 9.11 which occupies the surface of the optical field, and which can be positioned substantially at the same depth as the bottom 6 of channels 9.10.

Figure 3I:
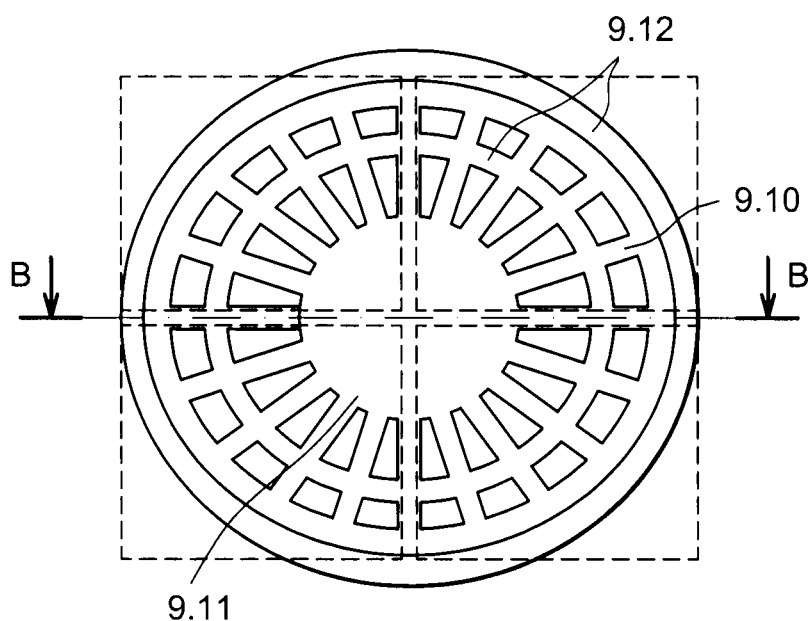

The examples presented above correspond to a facilitated and accelerated flow of peripheral chamber 5.2 to main chamber 5.1. Such devices are particularly advantageous in connection with lenses or mirrors with variable focal lengths. For image stabilisation devices it is sought, firstly, that the flows should be radial, but also that they should be orthoradial. FIG. 3I illustrates a radial and orthoradial flow example. Two concentric circular channels 9.12 and twenty radial channels 9.10 can be distinguished. A dish 9.11 is also incorporated, into which radial channels 9.10 emerge. This forced flow structure geometry 9 is only one example. It is clearly understood that the forced flow structure 9 with channels can have channels in other directions, provided the function to facilitate the flow from peripheral chamber 5.2 to main chamber 5.1 is obtained.

In FIG. 3I four separate flow areas which can be subjected to a dedicated actuation to accomplish image stabilisation have been represented with dotted lines.

In order not to overburden FIG. 3, no means of actuation have been represented, and forced flow structure 9 is still located in the bottom 6 of support 2.

We shall now consider several other variants of the membrane device forming the subject of the invention.

Figure 4A:
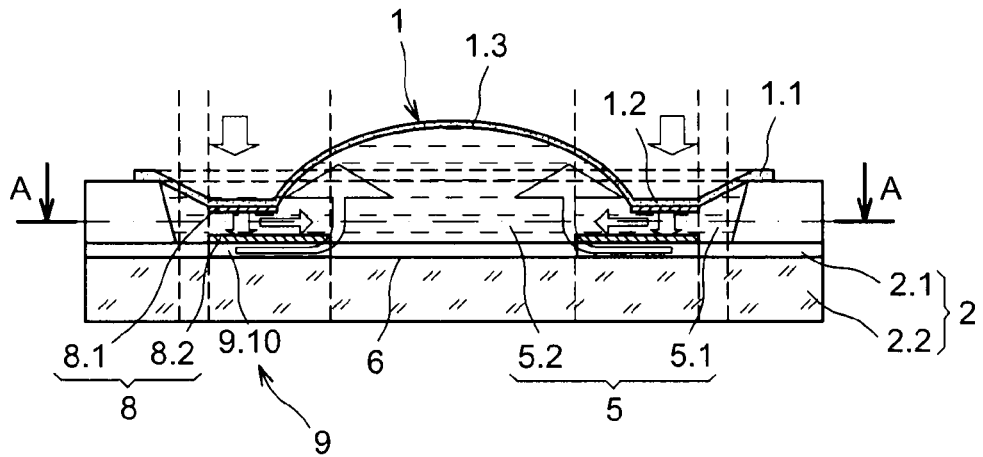
FIG. 4A shows in section a membrane device forming the subject of the invention with a forced flow structure incorporated in the bottom of the cavity, and with electrostatic means of actuation.
Figure 4B:
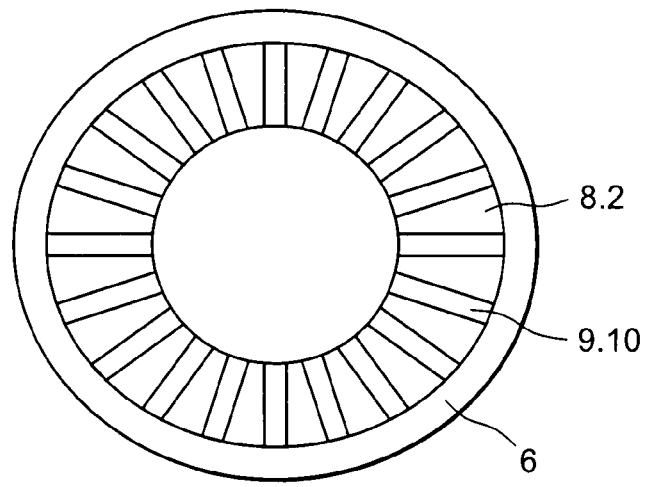
FIG. 4B is a top view of the bottom of the cavity.

In FIGS. 4A and 4B electrostatic means of actuation 8 with one or more mobile electrodes 8.1 connected to membrane 1 in actuation area 1.2, and multiple fixed electrodes 8.2 connected to the bottom 6 of support 2, have been represented, where two successive fixed electrodes 8.2 are separated by a channel 9.10 of forced flow structure 9. In this example, as in FIG. 3C, the bottom 6 is multi-layered and channels 9.10 are formed in surface layer 2.1 of the bottom 6. The base layer is referenced 2.2. Facing electrodes 8.1, 8.2 can be sufficiently close to ensure satisfactory actuation efficiency, without having an adverse effect on the membrane device's response time. In these FIG. 4, membrane 1 is represented as being single-layer, but it could of course be multi-layered, at least locally.

Figure 5A:
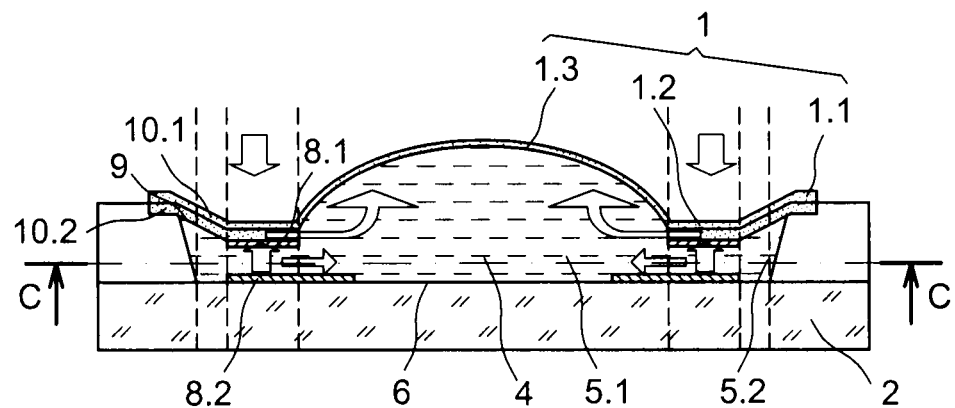
FIG. 5A shows in section a membrane device forming the subject of the invention with a forced flow structure incorporated in the membrane and with electrostatic means of actuation.
Figure 5B:
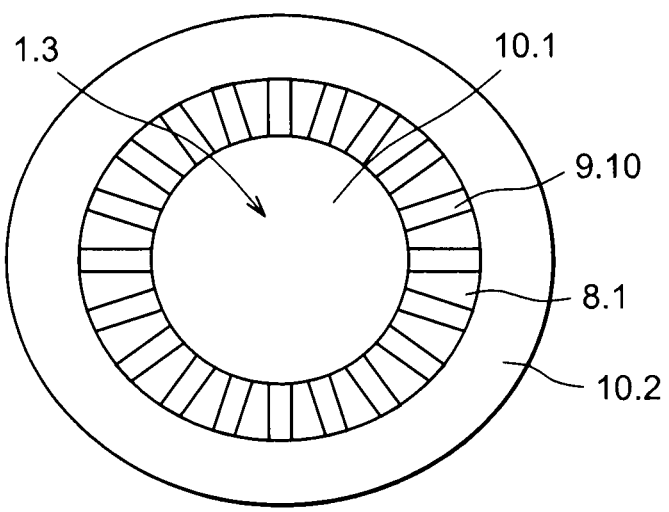
FIG. 5B is a view of the membrane as seen from below.

In FIGS. 5A, 5B, forced flow structure 9 is now connected to membrane 1. FIG. 5B is a view from beneath of membrane 1. Membrane 1 may be single-layer or multi-layered, at least in actuation area 1.2. It may be thicker in actuation area 1.2 than in central area 1.3. In the example of FIG. 5, membrane 1 has at least one first continuous layer 10.1 which extends from central area 1.3 to anchoring area 1.1, and at least one second layer 10.2 which is stacked with the first layer 10.1, and which extends into actuation area 1.2, and possibly into anchoring area 1.1. As a variant, membrane 1 could have been single-layer, but of variable thickness.

In this example there is a thickening in actuation area 1.2 and in anchoring area 1.1 compared to central area 1.3. The thickening could have been confined to actuation area 1.2.

In these configurations the thickening is not obligatory, but advantageous if the goal is to obtain a flexible membrane, thus one which is as fine as possible in the central area, in order to maximise deformation in the centre.

Forced flow structure 9 includes channels 9.10 directed from peripheral chamber 5.2 to main chamber 5.1; these channels 9.10 are located in actuation area 1.2, which is thickened. The thickness of the membrane in actuation area 1.2 between channels 9.10 is greater than that of the membrane in central area 1.3.

In the example, channels 9.10 are formed in the stacked layer or layers 10.2 with continuous layer 10.1; they can of course attain continuous layer 10.1 and even bite into it but must not, of course, weaken continuous layer 10.1, which would cause it to break.

Mobile electrodes 8.1 are connected to membrane 10 in actuation area 1.2; they extend between channels 9.10. A mobile electrode 8.1 has been represented between two successive channels 9.10, but this is only one example; it is possible to have fewer mobile electrodes. Support 2 includes one or more fixed electrodes 8.2 facing mobile electrodes 8.1. Here too, the thickness of fluid 4 between electrodes 8.1, 8.2 facing the means of actuation 8 can be reduced while the response time is increased compared to the prior art.

Placing forced flow structure 9 in the area of membrane 1 enables the rigidity of membrane 1 to be altered. Indeed, in actuation area 1.2 membrane 1 has a first rigidity in the area of channels 9.10, and a second rigidity, greater than the first rigidity, between channels 9.10. Such an alternation of the more rigid and less rigid areas can facilitate actuation efficiency, notably in the case of asymmetrical actuation, for an image stabilisation application, for example.

Layer or layers 10.2 participating in forced flow structure 9, other than continuous layer 10.1, can have functions other than those of accommodating channels 9.10 and of locally rigidifying actuation area 1.2 between channels 9.10. When they extend into anchoring area 1.1 they can improve the anchoring to support 2.

They can also be used to reduce the permeation of membrane 1, i.e. the capacity to traverse the membrane.

In FIGS. 5A, 5B, channels 9.10 have been represented as stopping before central area 1.3, but it is clearly understood that they could extend into central area 1.3, as was represented in FIG. 3G, when they were at the bottom 6 of the cavity. Mobile electrodes 8.1, for their part, would not encroach on central area 1.3.

Figure 6A:
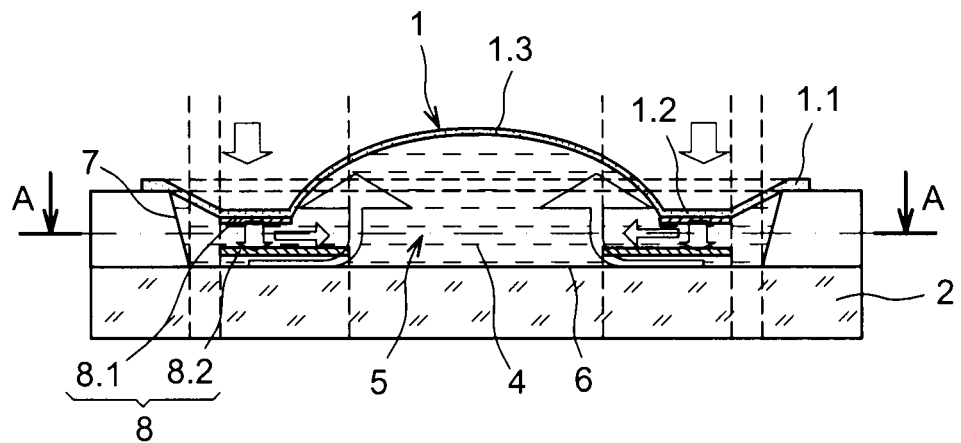
FIG. 6A shows in section a membrane device forming the subject of the invention with a forced flow structure incorporated in the electrostatic means of actuation from the side of the bottom of the cavity.
Figure 6B:
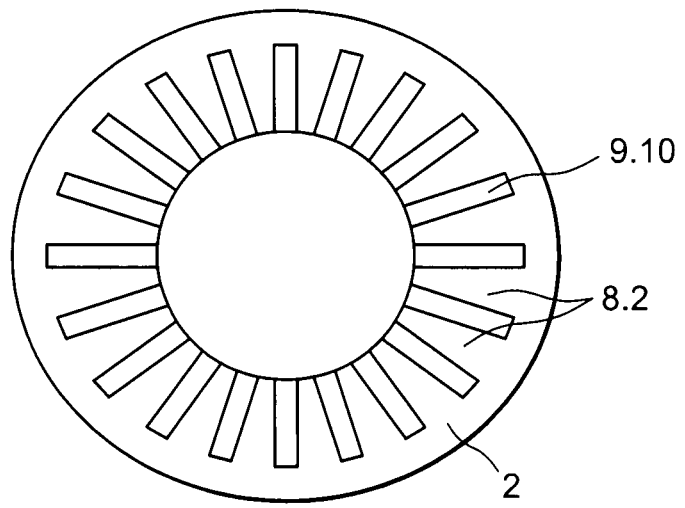
FIG. 6B is a view of the membrane as seen from below.

In FIGS. 6A and 6B, forced flow structure 9 is now incorporated in the means of actuation 8.

More specifically, the means of actuation 8 include one or more fixed electrodes 8.1 positioned on the bottom 6 of cavity 5. Forced flow structure 9 includes channels 9.10 which are formed by the spacing existing between two successive fixed electrodes 8.1, or which are formed in the single fixed electrode 8.1. In the first case, channels 9.10 expose the material of support 2, and not in the second case.

Figure 6C:
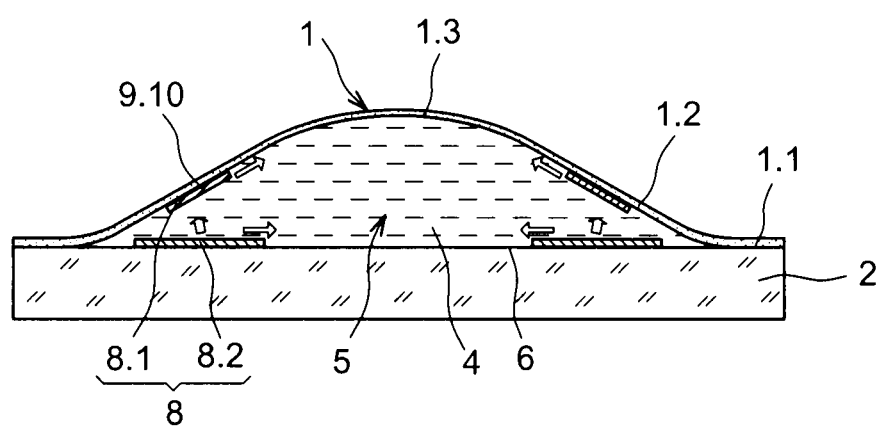
FIG. 6C shows in section a membrane device forming the subject of the invention with a forced flow structure incorporated in the electrostatic means of actuation from the side of the membrane.

Similarly, it could be envisaged that forced flow structure 9 is incorporated in the mobile electrode or electrodes 8.1 of the electrostatic means of actuation 8, provided this mobile electrode or these mobile electrodes 8.1 are in contact with the fluid 4. Reference may be made to FIG. 6C. In the foregoing description, a support 2 of membrane 1 has always been represented as having a depression receiving the fluid 4, but this is not an obligation. This is what is illustrated by FIG. 6C. Support 2 is substantially flat. This configuration of support 2 may apply to all variants in which the forced flow structure has channels.

Figure 7A:
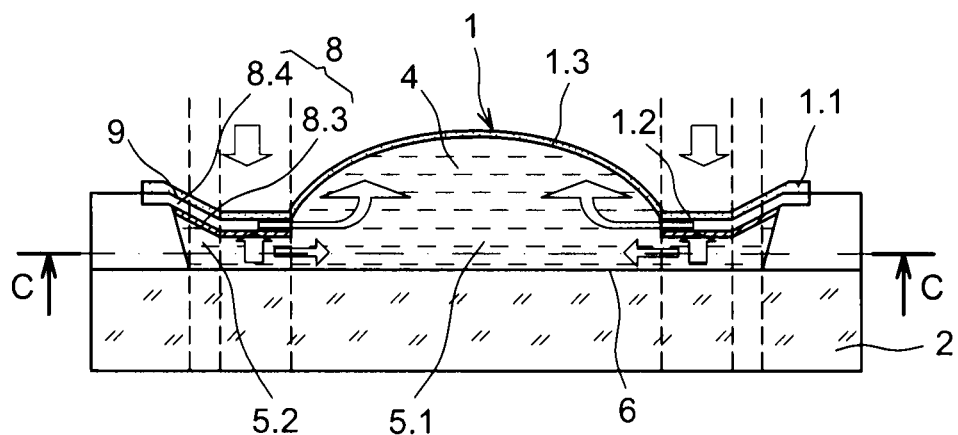
FIG. 7A shows in section a membrane device forming the subject of the invention with a forced flow structure incorporated in the piezoelectric-type, thermal bimorph or magnetic means of actuation from the side of the membrane.
Figure 7B:
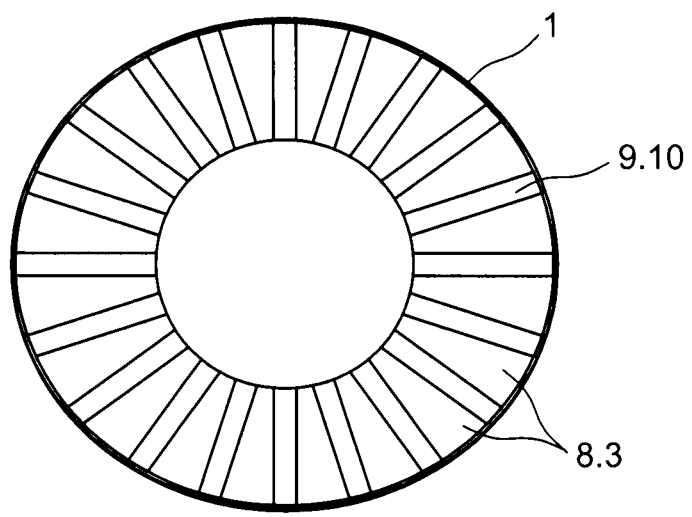
FIG. 7B is a view of the membrane as seen from below.

In FIGS. 7A and 7B another example of a membrane device according to the invention has been represented in which forced flow structure 9 is incorporated in the means of actuation 8, but now the means of actuation are piezoelectric. They could, of course, be thermal bimorphs, i.e. they could include at least two layers having different thermal expansion coefficients, or be magnetic. Membrane 1 supports, in actuation area 1.2 and possibly in anchoring area 1.1, on the side of the fluid 4, one or more stacked layers constituting means of actuation 8, where these layers are referenced 8.3, 8.4, and where layer 8.3 is in contact with the fluid 4. Of these layers 8.3, 8.4, at least one of them, in this case layer 8.4, may extend into anchoring area 1.1. Channels 9.10 of forced flow structure 9 are formed in at least one of these layers from the one in contact with the fluid 4. Layer 8.3 is located between two successive channels 9.10; it is defined with the shape of a ring-sector beam for example, able to be deformed on actuation from a rest position to an operating position by pulling membrane 1 to the bottom 6 of cavity 5. Here again a part of the fluid 4 located in peripheral chamber 5.2 will use channels 9.10 of forced flow structure 9 to move towards main chamber 5.1.

In both variants which have just been described, channels 9.10 can bite into the bottom 6 of the support, or merely expose it, or indeed eat into membrane 1, or merely expose it. It is of course possible that the channels do not reach the bottom 6 or membrane 1.

The membrane may be produced from a base of organic materials such as polydimethylsiloxane, methyl polymethacrylate, polyethylene terephtalate, polycarbonate, parylene, the epoxide resins, the photosensitive polymers, the silicones such as those known under the name SiNR from Shin-Etsu, or under the name WL5150 from Dow Corning, or of mineral materials such as silicon, silicon oxide, silicon nitride, silicon carbide, polycrystalline silicon, titanium nitride, diamond-like carbon, tin and indium oxide, aluminium, copper or nickel.

The fluid may be a liquid chosen from among propylene carbonate, water, a refractive index liquid, an optical oil or even an ionic liquid, or a gas chosen from among air, nitrogen, helium or argon.

The means of actuation may be produced from a base of PZT, aluminium nitride, vinylidene polyfluoride or its copolymers, trifluoro-ethylene, zinc oxide, barium titanate, lead niobate, sillenites such as bismuth titanate when they are piezoelectric, or from a base of conducting material of the metal type such as copper, silver, gold, aluminium, titanium or even ITO when they are electrostatic, with a base of silicon, silicon oxide or even silicon nitride when they are thermal bimorphs, or from ferromagnetic materials such as iron, nickel or cobalt when they are magnetic.

The support and notably its bottom may be made for example from glass, semiconductor material, or plastic.

The membrane device forming the subject of the invention may be made by known techniques in microelectronics. Thin-layer deposition techniques of the chemical vapor deposition type, of the vapor-phase physical deposition type by electroplating, epitaxy, thermal oxidation, evaporation or film laminating, may be used. Organic materials or materials of the sol-gel type may be deposited by spraying using a spin coater. Techniques of casting, embossing, hot-crimping or nano-printing may be used to structure the bottom 6 of cavity 5, and to produce channels 9.10 of forced flow structure 9. Gluing techniques may also be used for the gluing of membrane 1 to support 2, or of a bottom to a frame to which the membrane is anchored, and these techniques may, for example, be chosen from among direct gluing, eutectic gluing, anodic gluing or organic gluing. Steps of thinning, for example by grinding, chemical thinning, or indeed a combination of both types, may be included after the gluing of the bottom to the frame. The membrane device may be manufactured in batches.

Figure 8A:
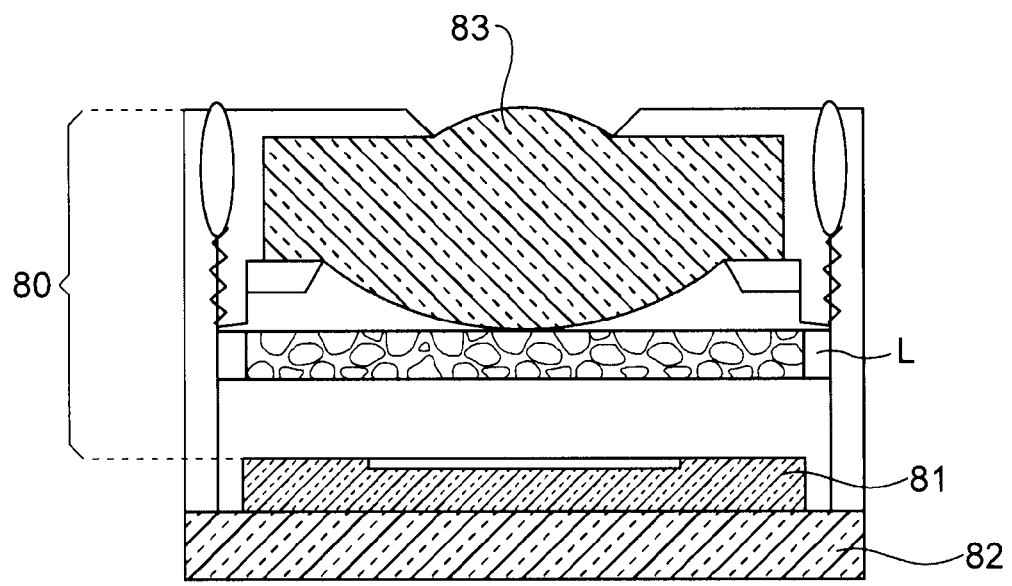
FIGS. 8A and 8B show an image-taking device fitted with a membrane device forming the subject of the invention.

Such a membrane device may be used as an optical device with a variable focal length in an image-taking device, notably that of a camera of a mobile phone. Reference should be made to FIG. 8A. Such an image-taking device includes, in series, an objective 80 including at least one optical device with variable focal length L according to the invention of the liquid lens type, and an image sensor 81, for example of the CCD or CMOS type, supported by a substrate 82. In the described example, objective 80 includes at least one lens 83 with a fixed focal length and one liquid lens L according to the invention. In what follows this fixed focal length lens 83 will be called a conventional optical unit. Liquid lens L is positioned between conventional optical unit 83 and image sensor 81. As a variant, conventional optical unit 83 may be positioned between liquid lens L and image sensor 81. This latter configuration is more advantageous for an autofocus application. Conventional optical unit 83 is static. As was seen above, owing to its manufacturing method liquid lens L may be considered equivalent to an MOEMS (opto-electromechanical microsystem). Variable focal length liquid lens L is positioned at a certain distance, which depends on the characteristics of objective 80, from image sensor 81, but if this distance is small liquid lens L and image sensor 81 will have to be combined into a single component, integrating them either using AIC (Above Integrated Circuit) technology, or using WLCSP (Wafer Level Chip Scale Package) technology. The focal length of liquid lens L is modified by optimising the pressure of the liquid at rest, but also the curvature of membrane 2 at rest, and the liquid's refractive index.

Figure 8B:
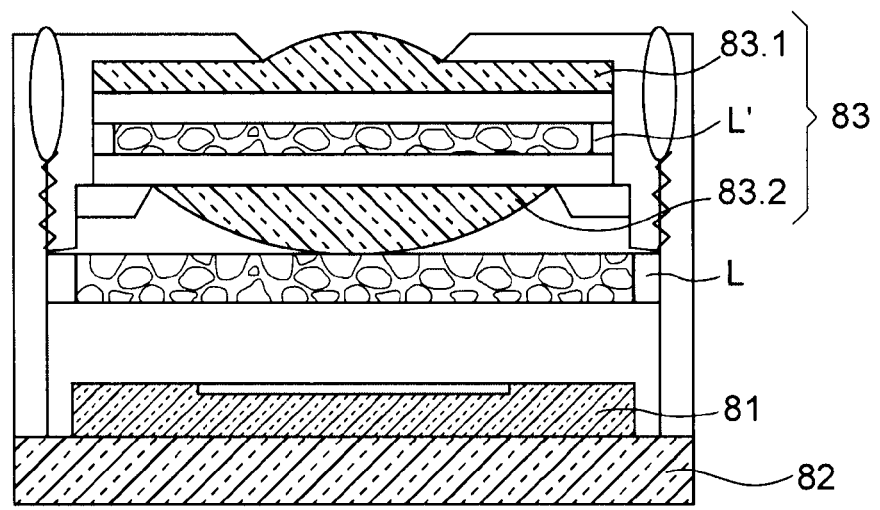

If the camera device also includes the zoom function as in FIG. 8B, an optical unit 83 will be used with at least two fixed focal length lenses 83.1 83.2 and two liquid lenses L and L', one of which is positioned between lenses 83.1, 83.2 of optical unit 83 and the other in proximity to image sensor 81, as in FIG. 8B. In these FIGS. 8A, 8B, the optical devices according to the invention referenced L and L' are represented very schematically: neither their means of actuation nor their forced flow structure can be seen. The use of two liquid lenses is a particular and widespread way of accomplishing the zoom function.

Although several embodiments of the present invention have been described in detailed fashion, it will be understood that various changes and modifications may be made without going beyond the scope of the invention. The various variants described must be understood as not being mutually exclusive: they may be combined.

The device forming the subject of the invention could include a forced flow structure with perforated wall, and at least one with channels. It may include a forced flow structure integrated in the membrane and/or integrated in the bottom and/or integrated in the means of actuation.

The invention claimed is:

1. A device having a membrane and a support defining a cavity containing a substantially constant quantity of a fluid, where the membrane includes an anchoring area peripheral to the support, a central area able to be deformed reversibly when a displacement of fluid occurs and an actuation area between the anchoring area and the central area, together with means of actuation intended to apply stress to the membrane in the actuation area and to cause a displacement of the fluid to the central area when an actuation occurs, characterised in that the cavity has a main chamber at the level of the central area and a peripheral chamber at the level of the actuation area communicating with the main chamber, and in addition the peripheral chamber includes at least one forced flow structure communicating with the main chamber to favour the flow of at least a part of the fluid from the peripheral chamber to the main chamber or vice versa when an actuation occurs, wherein the remainder of the fluid is displaced from the peripheral chamber to the main chamber, or vice versa, without passing through the forced flow structure, and wherein a given forced flow structure has no fastenings both to the support and to the membrane.

2. A device according to claim 1, in which the cavity is defined in the support by sides and a bottom, and where the forced flow structure includes a perforated wall protruding from the sides into the peripheral chamber in the direction of the main chamber.

3. A device according to claim 2, in which the means of actuation include multiple actuators coming into contact with the membrane in the actuation area in a contact area, and where the perforated wall includes at least one orifice facing a contact area.

4. A device according to claim 2, in which the perforated wall includes several areas which have many orifices and at least one area with no orifices.

5. A device according to claim 2, in which the perforated wall has at least one electrode of the means of actuation, where this electrode is opposite another electrode supported by the membrane.

6. A device according to claim 2, in which the perforated wall is closer to the actuation area than to the bottom of the cavity.

7. A device according to claim 1, in which the support forms a bottom for the cavity, the forced flow structure includes multiple channels incorporated in at least one of the membrane in the actuation area, the bottom facing the actuation area and the means of actuation, if they are in contact with the fluid, and where these channels are directed from the peripheral chamber to the main chamber.

8. A device according to claim 7, in which the channels are directed radially relative to the centre of the main chamber.

9. A device according to claim 8, in which the forced flow structure also has at least one orthoradial channel.

10. A device according to claim 7, in which the channels are formed in the bottom of the support and when the bottom of the support is multi-layered, the channels are totally or partially formed in a surface layer of the bottom.

11. A device according to claim 7, in which the channels are formed in the actuation area of the membrane, and where the actuation area can be thickened compared to the central area.

12. A device according to claim 11, in which the membrane has a stack of layers in the actuation area in which the channels are formed, and where this stack can extend at least partly in the anchoring area.

13. A device according to claim 7, in which the channels are defined by at least one of the means of actuation connected to the bottom and the means of actuation connected to the membrane in contact with the fluid, and where the channels can bite into or expose the bottom, or the membrane, respectively.

14. A device according to claim 7, in which the channels located in the bottom penetrate into the main chamber.

15. A device according to claim 14, in which the channels emerge in a dish supported by the bottom located in the main chamber.

16. A device according to claim 7, in which the bottom has a peripheral pit in the peripheral chamber opposite the main chamber, where the channels emerge into the pit when they are formed in the bottom.

17. A device according to claim 1 characterised in that it is a mirror or a lens.

18. An image-taking device, characterised in that it includes a device according to claim 1.

* * * * *